Sept. 14, 1937.  F. SUYS  2,093,292

VARIABLE SPEED TRANSMISSION

Filed Aug. 13, 1935  2 Sheets—Sheet 1

Inventor:
Ferdinand Suys

Inventor: Ferdinand Suys

Patented Sept. 14, 1937

2,093,292

UNITED STATES PATENT OFFICE 2,093,292

VARIABLE SPEED TRANSMISSION

Ferdinand Suys, Meysse, Belgium, assignor to Societe Pour le Perfectionnement et L'Exploitation des Transmissions Mecaniques, Société Anonyme, Brussels, Belgium Application August 13, 1935, Serial No. 35,976
In Belgium November 5, 1934

3 Claims. (Cl. 74—64)

This invention relates to improvements in the apparatus for the transmission of mechanical energy, in which for a predetermined speed of the driving member, the speed of the driven member varies automatically and continuously according to the resistance which is being opposed.

The energy transmitted to the driven member by the apparatus according to the present invention is a function of the difference between the speed of the driving member and that of the driven member. In the case of the modes of application which are hereinafter more particularly described, the driving couple is substantially proportional to the square of the said difference.

The apparatus is to be applied more particularly to road and rail vehicles, to which the energy is transmitted by an explosion engine or by an internal combustion engine. The present apparatus offers in these cases the advantage of automatically and continuously modifying the characteristics of the mechanical energy supplied by the driving member and of adapting the said characteristics to the conditions of working, the driver having only to adjust the quantity of energy to be developed by the engine.

The invention may also be used for various applications in the textile industry and for operating various machinery.

The invention is based upon a new mode of action of inertia reactions supplied by moving masses which are moved along a predetermined path with a peripheric speed which varies periodically.

According to the present invention, each of said moving masses is connected to the driving member and is moreover subjected to be moved along a path made integral with the driven member, the centre of curvature of the said path being at each point placed outside the axes of the driving and driven members. The said mass is thus subjected to alternately positive and negative accelerations to which it opposes corresponding inertia reactions.

During a first part of the period of movement of the mass considered, the latter is subjected to a positive acceleration. The corresponding force of inertia is applied direct at the point of articulation to the moving mass of the member which connects the latter to the driving member. This force of inertia is therefore decomposed at that point into two other forces, the first directed along the member which connects the mass to the driving member and which tends to oppose the rotation of the latter, the second being directed in a direction substantially perpendicular to the surface which is integral with the driven member and along which the mass considered is being moved. Means such as antifriction packings, ball bearings, roller bearings and the like are provided between the moving mass and the said surface in order to eliminate as much as possible a tangential component due to friction. The second force passes therefore through the centre of curvature of the said surface. As the said centre is not situated on the axis of the driven member, it follows that the latter is subjected to a rotating couple. As the force which produces the driving couple is transmitted direct between smooth surfaces having a relative movement, the driven member may have any speed, and this speed may even be null, and depends only on the work effected by the motor and on the size of the resisting couple.

The amount of energy transmitted by the driving member at a speed N$m$ and non-utilized on the driven shaft which rotates at a speed Ne which is generally lower than N$m$, is stored during the first part of the period in the form of an increase of the live force of the mass considered.

During the remaining part of the period, the second half-period for instance, the mass is itself subjected to a negative acceleration owing to its connection to the driven mass and to the path along which it is guided, which negative acceleration produces also a force of inertia. The latter force decomposed along the member connecting the driving member to the mass and along a line perpendicular to the path of the mass, produces as well in the driving member as in the driven member reactions which have a tendency to carry them in the direction of their motion.

The said mass loses thus the excess of live force which it has received during a first part of the period, first half-period for instance, and returns the corresponding energy either to the driving member or to the driven member.

If the latter is held stationary, the energy spent is null, with the exception of the passage losses. The whole of the energy developed by the engine during the first half-period is stored inside the mass in the form of kinetic energy. This energy is returned entirely by the mass during the second half-period.

If the driven member moves against a resistance, the energy absorbed produces a difference between the work supplied by the engine during the first half-period and that returned during the second half-period.

If $n$ identical moving masses are used, the respective periods of which are dephased through $$\frac{2\pi}{n}$$

it will be observed that the driving member supplies an average couple, the regularity of which increases when $n$ increases. Also, the driven member is subjected to an average couple, the regularity of which increases with the number $n$; the greater the difference between the speeds of the driving and driven shafts or members, the more powerful is this latter couple relatively to the first one.

According to the present invention, friction devices or gearing or wedging devices are dispensed with between the driving and driven members.

The invention may be carried out in various ways.

In the accompanying drawings.

Figure 3:
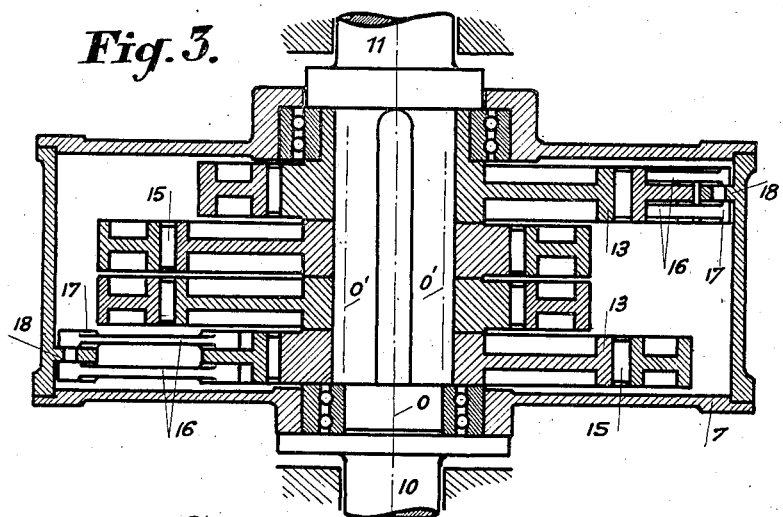
Figures 2 and 3 are respectively a cross-section and a longitudinal section of one form of the apparatus.
Figure 2:
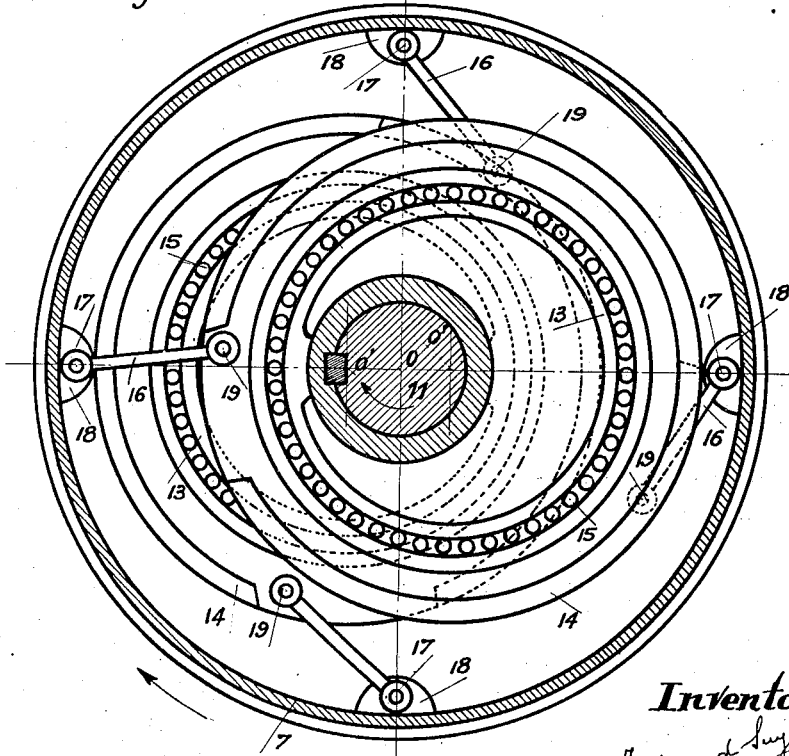

Referring to Figs. 2 and 3, a drum 7 having an axis 0, is fixedly mounted on to the end of a driving shaft 10 and centered on the driven shaft 11 by a bearing with double rotation. The driven shaft 11 carries a certain number of discs 13 arranged one after another inside the drum 7, the centres of said discs being situated at points such as $0^1$ at a distance $00^1$ from the axis 0 common to the two shafts. The centres $0^1$ of the discs 13 may be situated on the same line or on several lines parallel with each other and angularly displaced around the axis 0.

One or several solid rings 14 are adapted to rotate around each of the discs 13, either on smooth bearings, or upon suitable roller bearings 15. The said rings act as small flywheels rotating each around their centre $0^1$ relatively to the discs 13. Each of the flywheels 14 is attached to a link 16 which is on the other hand linked at a point 17 of the inner surface of the drum 7. The linking points of the links 16 on the drum 7 may be arranged in alignment along a generating line of the drum or in several parallel alignments or they may be distributed at equal distances at the periphery around the central axis 10.

The position of the points 17 is connected to that of the respective centres $0^1$ of the discs 13 upon the central shaft 11, in such a manner that by means of the $n$ flywheels, $$\frac{n}{k}$$

distinct phases are obtained. The choice of the values of $n$, of $k$, the distribution of the connecting points of the links 16 and that of the centres $0^1$ of the discs 13 around the axis 0 depends in each particular case on the mode of balancing the radial reactions upon the two shafts and on the regularity of the couples to be produced.

The links have preferably a slightly greater length than the distance $17a-19a$ (Fig. 1), so that the angle made by the instantaneous direction of the link 16 with the line $19-0'$ which connects the centre of the excentred member with the point of articulation of the link on the moving mass shall be smaller than 180°. Moreover, the sizes chosen for the excentricity $00'$ and for the length of the links 16 shall preferably satisfy the condition that the said angle shall not be smaller than 90°.

Figure 1:
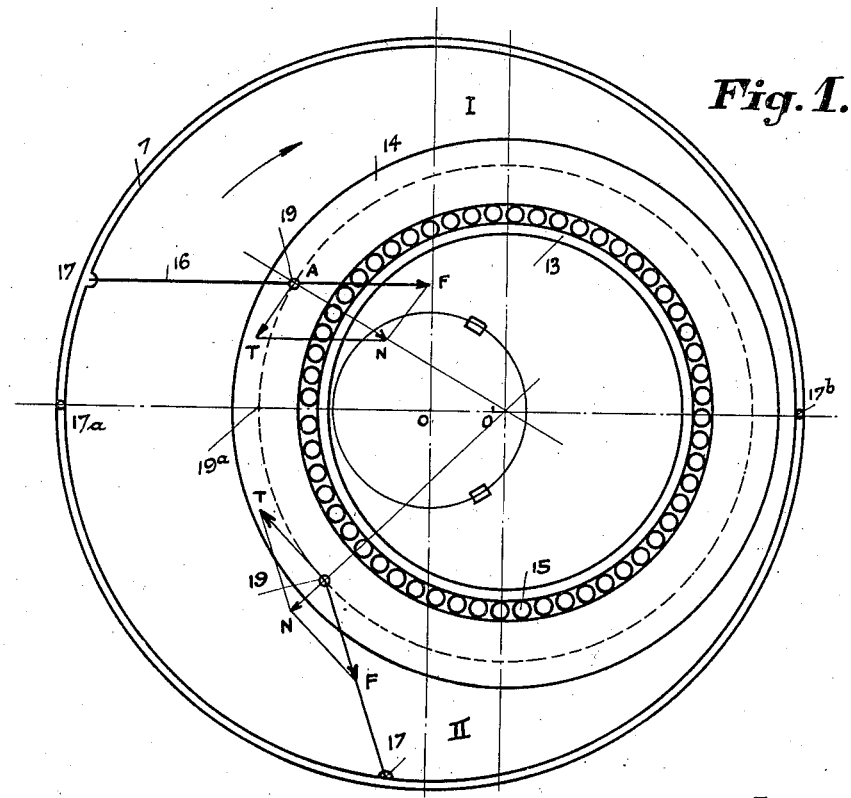
Fig. 1 is a diagrammatical view intended to facilitate the comprehension of the description of the working of an apparatus constructed according to Figures 2 and 3.

Let us consider now Fig. 1. Let us assume that the driven shaft is held stationary by means of brakes. The discs 13 fixedly mounted upon the driven shaft are stationary. Let us also assume that the drum 7, keyed upon the driving shaft, rotates at a constant speed $wm$. The linking points 17 of the links 16 on the drum, are displaced with the same speed around the axis 0. The points 19 integral with the corresponding flywheels rotate around centres $0'$ of the excentric discs 13. When the point 17 passes from $17a$ to $17b$ through the zone marked I, the corresponding point 19 is pushed with an increasing speed. The angle $17-19-0'$ becomes smaller and smaller. The flywheel opposes to the said increase of speed a force of inertia T which is tangential to the circle which has $0'$ as its centre. This force T is balanced by the forces F and N, of which F is a force of compression of the link, and N is a force of compression of the flywheel upon its rollers. The force N is perpendicular to the circle and passes therefore through the centre $0'$. It has a tendency to drive $0'$ around the axle 0 of the driven shaft, in the direction of rotation of the driving drum.

The compression of the link has of course a tendency to oppose the rotation of the drum and requires therefore a driving force.

The energy spent by the engine during the first half-period (Zone I) serves therefore wholly to increase the live force of the flywheel if, as it has been assumed, the secondary shaft is held stationary.

In the Zone II, the angular speed of the flywheel decreases when the point 17 is displaced with a constant speed away from the periphery of the ring. The reaction of inertia T is now directed in the direction of the motion. The vector resulting from the combination of the forces T and F is a force N which is perpendicular to the rolling path and is directed towards the outside of the ring.

The direction of the force N is such that it has still a tendency to drive the centre $0'$ of the excentric disc around the centre 0 in the direction of rotation of the drum. The loss of live force of the ring returns to the driving drum the energy which it had developed during the first half-period.

During the whole period, a variable but generally positive pressure has been exerted on the centre $0^1$ of the excentric disc. No work has been effected because the said pressure has not produced any displacement of the disc integral with the driven shaft (assumed to be stationary).

The curve representing the positive or negative driving couples during the period, has the general appearance of an altered sinusoid the total inscribed surface of which is algebraically equal to zero (with the exception of the passive losses). By superposing the diagrams of the $n/k$ systems of links-flywheels which form as many distinct phases, and taking as a common origin a given moment, the instantaneous couple on the driving shaft is formed of the algebraical sum of the $$\frac{n}{k}$$

ordinates corresponding to one and the same abscissa. The resulting couple oscillates in time around zero, with an amplitude which is so much smaller when the member $$\frac{n}{k}$$

is larger, and with a frequency equal to $n.wm/2\pi k$.

If, after yielding to the force to which it is subjected the shaft 11 (Fig. 2) is carried at a speed $w_e$, the discs 13 of centre 0' rotate around the axis 0. The flywheels take part in this motion. They rotate therefore at the same time around both centres 0' and 0. If the speed of rotation $w_m$ of the engine and that $w_e$ of the driven shaft are the same, the relative speed of the flywheels around centres 0¹ is zero. Therefore the accelerations which produce the forces T are null, which has for its result the loss of the forces N and of the driving couple. It follows that the latter is zero when the two shafts, primary and secondary, rotate synchronically.

On the other hand, if the secondary shaft is stationary, the forces of inertia are maxima for a certain speed of the engine. The same remark applies to the average driving couple.

Between these two extreme conditions, the driving couple depends on the relative speed of the two shafts, this relative speed determining the value of the forces T which produce the pressures N.

The mathematical study of the system enables to formulate the three following conclusions which apply to the above described modes of carrying the invention into effect:

1.—The driving couple is proportional to the square of the relative speed of the two shafts and is equal to zero when the speeds of the shafts are equal to zero.

2.—For a constant running of the engine, the driving couple is proportional to the square of the "slipping", which is given by the formula:

$$s = \frac{wm - we}{we}$$

3.—The starting couple is proportional to the square of the speed of the engine at the moment when starting takes place.

As to the couple on the driving shaft, it is equal to the driving couple multiplied by the factor $(1-g)$.

The two couples are equal to zero, with the exception of the resistances, for $s=0$ (synchronism). The driving couple is maximum and the driving couple is null for $s=1$ (starting).

According to a modified form of carrying the invention into effect, the drum is keyed on to the driven shaft, and the driving shaft is placed at the centre of the apparatus. Under these conditions, the inner surface of the drum is formed of circles having their centres on the various axes 0¹ around the axis 0. The flywheels will have then their outer surface in contact with the inner periphery of the drum. They will be each articulated to a link which is articulated on the other hand to a disc mounted on the central shaft and concentrical with the latter.

It is also possible to make use of flywheels of larger radius and having a comparatively small mass. On the contrary, the roller bearings between the flywheels and the driven member (in this case, the drum) have a larger diameter.

In principle, the apparatus may rotate in both directions. However, it is preferable to rotate it in a direction such that the joint 19 of the link with the flywheel shall be in advance relatively to the joint 17 in the direction of the motion (case of Fig. 1). Indeed, owing to the small extra-length which it is necessary to give to the link 16 above the distance 17a—19a, in order to avoid too high forces at the passage of the alignment 17a—19a, the point of reversal of the direction of acceleration of the flywheels is situated above the point 17a. If the point 19 is behind the point 17, a zone is formed between the said point of reversal of direction of motion and the point 17a, in which the forces N transmitted by the flywheels to the discs 13 are reversed too soon, thus producing a reversal of the driving couple. The more the point 19 remains behind the point 17, the more important is the average length of leverage of the local antagonistic effort N relatively to the centre 0. It follows that the average couple resulting from all the flywheels is more irregular and that it is necessary to increase the number $n$ of the flywheels.

If on the contrary the rotation takes place in a direction such that the point 19 is in advance relatively to the point 17, the antagonistic zone is very much reduced and the reversed driving couple is insignificant.

Instead of rotating the flywheels on excentric discs such as the members 13, it is also possible to rotate them on the crank pins of a crankshaft which replaces in this case the driven shaft. That allows of reducing the diameter of the rollers inserted between the flywheels and the driven members. On the contrary, the length of the apparatus is thus increased.

In case that the driving shaft occupies the centre of the apparatus and that the drum forms the driven member and carries the paths along which are displaced by the moving masses, it is possible to subdivide each of the latter into a certain number of distinct masses rotating at the contact of the inner surfaces of the drum in one and the same transverse plane. These local masses are then each connected by a link to the periphery of a central disc mounted on the driving shaft. The said masses may consist of rollers or sliding blocks, which roll or slide upon the excentric inner surfaces of the drum. The said moving masses may be guided at the contact of the rolling surfaces by a counter-rail having the same centre 0' as the main paths.

By such an arrangement, it is possible to multiply by 4 or 6 or 8 the number of distinct phases of the apparatus. On the contrary, the diagram of the instantaneous couples supplied by a given mass is strongly modified by the local action of the centrifugal force which is no longer balanced as is the case of annular flywheels.

By the same arrangement it is also possible to replace the guiding circular surfaces by surfaces having several excentricities such as elliptical surfaces which give a higher uniformity.

Figure 4:
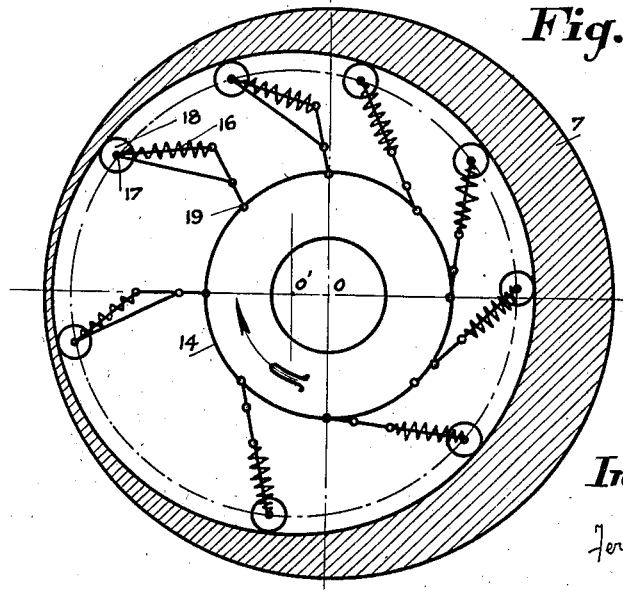
Fig. 4 shows a modification of construction of the apparatus.

Such a mode of carrying the invention into effect with circular guiding surfaces is illustrated in Figure 4. The direction of rotation shown in Figure 4 is such that the joints of the primary member are in advance on those on the moving masses. Such an arrangement produces considerable antagonistic couples before the passage of the line 00'. In order to avoid them, an additional joint has been provided within the link, which additional joint is stretched by a spring. The compression of the link produces a movement sideways of the joint in such a manner that the negative acceleration of the masses is carrier to the upper zone of the drawings. The contraction of the spring limits the said side movement of the link and produces afterwards its gradual straightening. This straightening is itself damped by the inertia of the mass which has a tendency to maintain as long as possible its highest speed.

Such an arrangement which may also utilize a centrifugal counterweight instead of a spring, eliminates almost completely the zone of the antagonistic couples.

I claim:

1. An automatic continuously variable speed transmission, comprising a rotary driving member, a rotary driven member, moving masses each permanently connected to the rotary driving member and moving with a cyclically variable speed, a plurality of members integral with the rotary driven member and eccentrically arranged relatively to the driving and driven members, resiliently formed links for driving the moving masses independently of each other with a cyclically variable speed around the member integral with the rotary driven member whilst avoiding friction, the moving masses having a value such that the inertia forces resulting from their cyclically variable speed are strong enough to allow of transmitting the required power at a reduced speed when the resistance increases and the centres of the eccentrically arranged members being placed in such a manner that the various cycles are dephased relatively to each other, and said links having a length such that the angle formed by the instantaneous direction of the link with the line connecting the centre of the eccentrically arranged member with the point of connection of the moving mass with the connecting link shall be always comprised between 180° and 90°.

2. An automatic variable speed transmission, comprising a rotary driving member, a rotary driven member, a plurality of flyweights each permanently connected to the rotary driving member, a plurality of members eccentrically disposed relatively to the driven member and made all permanently integral with the latter, links for driving the flyweights with a cyclically variable speed around the eccentrically disposed member, each of said links oscillating independently of the others and forming with its corresponding flyweight and eccentric a complete unit, the length of the links and their angle of oscillation, together with the mass of the flyweights being such that during the rotation of the driving member, the tangential inertia force resulting from the cyclically variable speed of the flyweight combines with the force engendered in the link so as to produce a torque which is mainly positive during a cycle thus rotating the driven shaft with the required intensity, as set forth.

3. An automatic continuously variable speed transmission, comprising a rotary driving member, a rotary driven member, moving masses each permanently connected to the rotary driving member and moving with a cyclically variable speed, a plurality of members integral with the rotary driven member and eccentrically arranged relatively to the driving and driven members, links for driving the moving masses independently of each other with a cyclically variable speed around the member integral with the rotary driven member whilst avoiding friction, the moving masses having a value such that the inertia forces resulting from their cyclically variable speed are strong enough to allow of transmitting the required power at a reduced speed when the resistance increases and the centres of the eccentrically arranged members being placed in such a manner that the various cycles are dephased relatively to each other, and said links having a length such that the angle formed by the instantaneous direction of the link with the line connecting the centre of the eccentrically arranged member with the point of connection of the moving mass with the connecting link shall be always comprised between 180° and 90°.

FERDINAND SUYS.